(12) United States Patent
Kotecha et al.

(10) Patent No.: US 8,909,728 B2
(45) Date of Patent: Dec. 9, 2014

(54) RETRIEVING CONTENT FROM LOCAL CACHE

(75) Inventors: Lalit R. Kotecha, San Ramon, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 272 days.

(21) Appl. No.: 13/398,146

(22) Filed: Feb. 16, 2012

(65) Prior Publication Data

US 2013/0219005 A1    Aug. 22, 2013

(51) Int. Cl.
*G06F 15/167* (2006.01)

(52) U.S. Cl.
USPC .......................................... 709/212; 709/234

(58) Field of Classification Search
CPC .. H04L 65/80; H04L 67/2828; H04L 67/2842
USPC ................................................... 709/212, 234
See application file for complete search history.

(56) References Cited

U.S. PATENT DOCUMENTS

| | | | |
|---|---|---|---|
| 2012/0210381 A1* | 8/2012 | Ozawa | 725/114 |
| 2013/0081072 A1* | 3/2013 | Alward et al. | 725/14 |
| 2013/0132544 A1* | 5/2013 | Krishnan et al. | 709/223 |
| 2013/0144979 A1* | 6/2013 | Kansal et al. | 709/219 |

* cited by examiner

*Primary Examiner* — Nicholas Taylor

(57) ABSTRACT

A network device transmits, to a cache located proximate to the network device, instructions to store content in the cache. The cache stores the content based on the instructions. The network device further receives a request for the content from a mobile communication device; determines, based on the request, that the content is stored in the local cache; and retrieves the content from the local cache. The network device also creates packets based on the retrieved content, and transmits the packets to the mobile communication device.

20 Claims, 8 Drawing Sheets

100

RETRIEVING CONTENT FROM LOCAL CACHE

BACKGROUND

Mobile devices are receiving increasing amounts of content, such as video streams, from content providers. Each time content is requested by a mobile device, the content is transmitted from the content provider to the mobile device, via a network (e.g., the Internet) and via multiple network devices of a cellular network. Transmission of the content to the mobile device may be delayed due to delays caused by the network and/or by the cellular network. Such delays may create a poor user experience for a user of the mobile device. Furthermore, if the same content is retransmitted over the cellular network, such retransmissions of the same content may consume a significant amount of bandwidth of the cellular network.

DETAILED DESCRIPTION OF PREFERRED EMBODIMENTS

The following detailed description refers to the accompanying drawings. The same reference numbers in different drawings may identify the same or similar elements.

Systems and/or methods described herein may store content in a local cache, and may retrieve the content from the local cache when the content is requested by a mobile device. For example, a base station, of a cellular network, may determine that particular content is being frequently requested by mobile devices associated with the base station. The base station may transmit instructions to a local cache to store the particular content, and the local cache may store the particular content based on the instructions. When the base station receives a new request for the particular content from a mobile device, the base station may determine that the particular content is stored in the local cache. The base station may retrieve the particular content from the local cache, may create packets based on the particular content, and may transmit the packets to the mobile device.

As a result, the base station may not have to retrieve the particular content from a content provider and may quickly provide the particular content to the mobile device. Thus, a user of the mobile device may not have to wait for the particular content to be retrieved by the base station from the content provider. Furthermore, bandwidth of the cellular network may not be consumed since the particular content does not need to be retransmitted to the base station via the cellular network.

Figure 1:
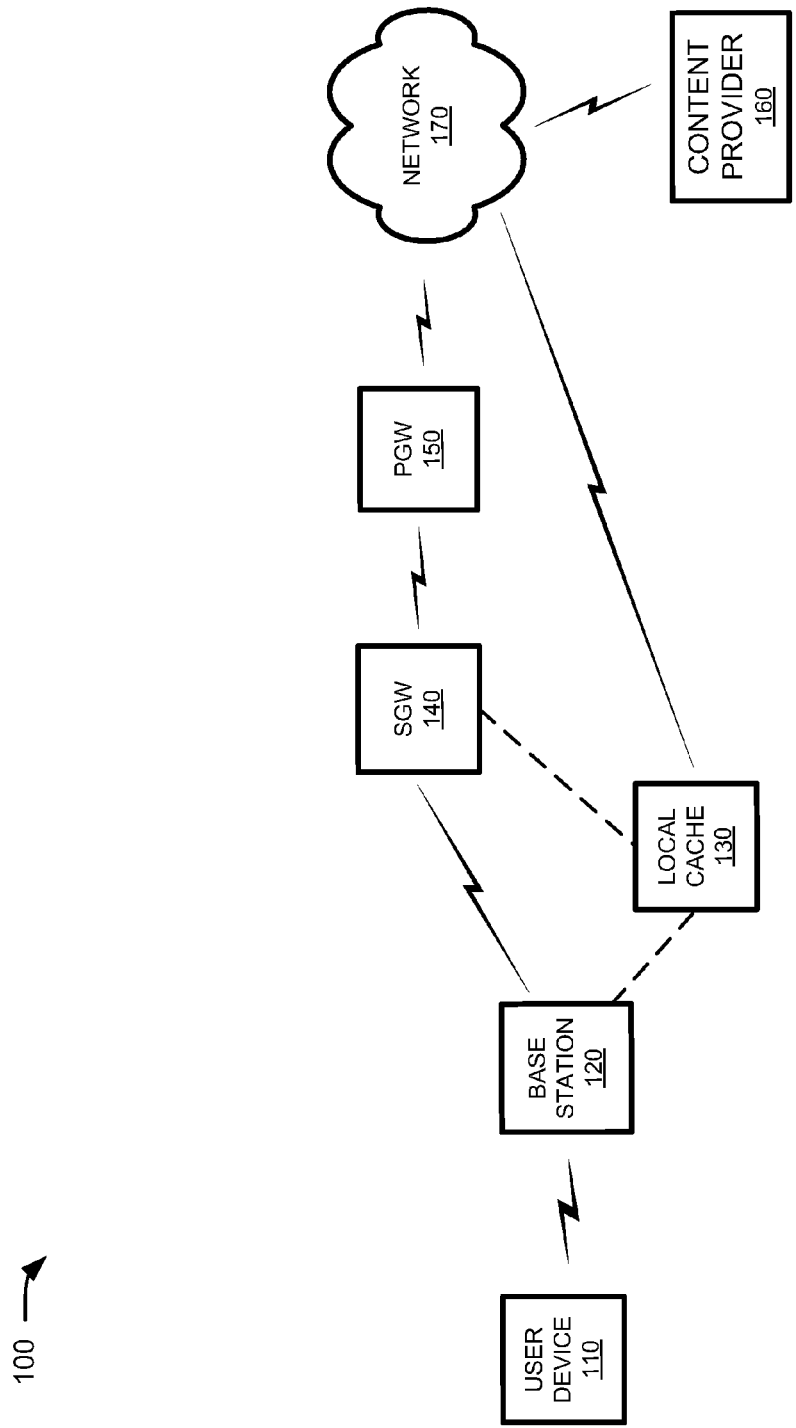
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a base station 120, a local cache 130, a serving gateway (SGW) 140, a packet data network (PDN) gateway (PGW) 150, a content provider 160, and a network 170. A single user device 110, base station 120, local cache 130, SGW 140, PGW 150, content provider 160, and network 170 have been illustrated in FIG. 1 for simplicity. In practice, there may be more user devices 110, base stations 120, local caches 130, SGWs 140, PGWs 150, content providers 160, and/or networks 170.

In one example implementation, environment 100 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 120, such as evolved Node Bs (eNBs), via which user device 110 communicates with the EPC network. The EPC network may include SGWs 140 and/or PGWs 150 that enable base station 120 to communicate via network 170 and/or with an Internet protocol (IP) multimedia subsystem (IMS) core network. The LTE network or the EPC network may include one or more local caches 130.

User device 110 may include a device that is capable of communicating with base station 120. For example, user device 110 may include a mobile communication device, such as a radiotelephone; a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a tablet computer; a laptop computer with a wireless air card; a global positioning system (GPS) device; a content recording device (e.g., a camera, a video camera, etc.); a voice over Internet protocol (VoIP) device; an analog terminal adaptor (ATA); etc. In one example, a user of user device 110 may prompt user device 110 to transmit a request for content, provided by content provider 160, to base station 120.

Base station 120 may include one or more devices that receive, process, and/or transmit traffic, such as voice, video, text, and/or other data destined for and/or received from user device 110. Base station 120 may combine the functionalities of a base station and/or a radio network controller (RNC) in second generation (2G) or third generation (3G) radio access networks. In one example implementation, base station 120 may be an eNB associated with the LTE network that receives traffic from and/or sends traffic to local cache 130 and/or SGW 140. Base station 120 may send traffic to and/or receive traffic from user device 110 via an air interface.

In one example, base station 120 may receive a request for content from user device 110, may retrieve the content from content provider 160 or local cache 130, and may transmit packets, based on the content, to user device 110. In one example implementation, base station 120 may receive the content in the form of packets that are transmitted from local cache 130 to base station 120 via an S1-U interface, and base station 120 may forward the packets to user device 110. Alternatively, or additionally, base station 120 may create packets, such as Internet protocol (IP) packets, based on the content received from local cache 130, and may transmit the IP packets to user device 110.

Local cache 130 may include one or more devices that store content received from content provider 160. In one example implementation, local cache 130 may store content for base station 120, and may provide the content to base station 120. Alternatively, or additionally, local cache 130 may store content for SGW 140, and may provide the content to SGW 140. Alternatively, or additionally, local cache 130 may be incorporated within base station 120 and/or SGW 140. In one implementation, local cache 130 may connect to content provider 160 via network 170.

SGW 140 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. SGW 140 may, for example, receive traffic from one or more base stations 120, may aggregate the traffic, and may send the aggregated traffic to network 170 (e.g., via PGW 150) and/or other devices associated with the EPC network. SGW 140 may also receive traffic from network 170 and/or the other devices, such as content provider 160, and may send the received traffic to user device 110 via base station 120.

In one example, SGW 140 may retrieve content from local cache 130 instead of retrieving the content from content provider 160 via PGW 150 and network 170. In one example implementation, SGW 140 may receive the content in the form of packets that are transmitted from local cache 130 to SGW 140 via an S5 interface, and SGW 140 may forward the packets to user device 110 via base station 120. Alternatively, or additionally, SGW 140 may create packets, such as IP packets, based on the content received from local cache 130, and may transmit the IP packets to user device 110 via base station 120.

PGW 150 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 150 may aggregate traffic received from one or more SGWs 140, and may send the aggregated traffic to network 170. Alternatively, or additionally, PGW 150 may receive traffic from network 170, and may send the traffic to user device 110 via SGW 140 and base station 120.

Content provider 160 may include any type or form of content provider. For example, content provider 160 may include free television broadcast providers (e.g., local broadcast providers, such as NBC, CBS, ABC, and/or FOX); for-pay television broadcast providers (e.g., TNT, ESPN, HBO, CNN, etc.); Internet-based content providers that stream content from web sites and/or permit content to be downloaded (e.g., via progressive download, etc.); and/or on-demand content providers (e.g., video on demand (VOD), pay per view (PPV), etc.).

Content provider 160 may represent one or more servers, or other types of computation and communication devices, of a particular content provider. In one example implementation, content provider 160 may provide content to user device 110 and/or local cache 130 in response to requests received from user device 110 and/or local cache 130. Alternatively, or additionally, content provider 160 may provide content to local cache 130 based on information regarding events associated with the content, as described further below with reference to FIG. 7.

Network 170 may include one or more wired and/or wireless networks. For example, network 130 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Although FIG. 1 shows example devices/networks of environment 100, in other implementations, environment 100 may include fewer devices/networks, different devices/networks, differently arranged devices/networks, and/or additional devices/networks than depicted in FIG. 1. Alternatively, or additionally, one or more devices of environment 100 may perform one or more tasks described as being performed by one or more other devices of environment 100.

Figure 2:
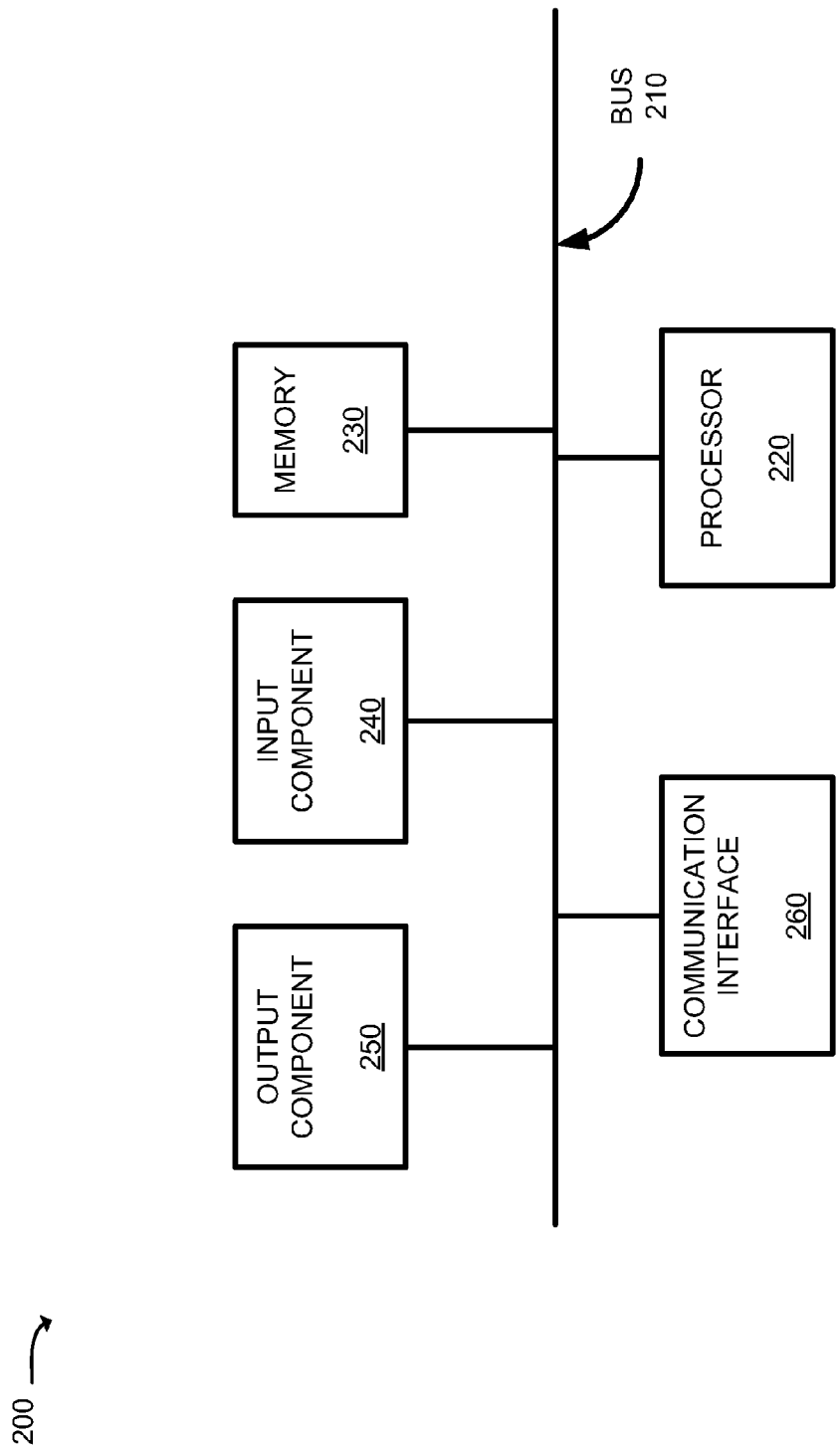
FIG. 2 is a diagram of example components of one or more of the devices of FIG. 1.

FIG. 2 is a diagram of example components of a device 200. Device 200 may correspond to user device 110, local cache 130, SGW 140, PGW 150, and/or content provider 160. Alternatively, or additionally, each of user device 110, local cache 130, SGW 140, PGW 150, and/or content provider 160 may include one or more devices 200 and/or one or more components of device 200.

As shown in FIG. 2, device 200 may include a bus 210, a processor 220, a memory 230, an input component 240, an output component 250, and a communication interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include one or more processors, microprocessors, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

In another implementation, communication interface 260 may include, for example, a transmitter that may convert baseband signals from processor 220 to radio frequency (RF) signals and/or a receiver that may convert RF signals to baseband signals. Alternatively, communication interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 260 may connect to an antenna assembly (not shown in FIG. 2) for transmission and/or reception of the RF signals.

The antenna assembly may include one or more antennas to transmit and/or receive RF signals over the air. The antenna assembly may, for example, receive RF signals from communication interface 260 and transmit them over the air, and receive RF signals over the air and provide them to communication interface 260. In one implementation, for example, communication interface 260 may communicate with network 170 and/or devices connected to network 170.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
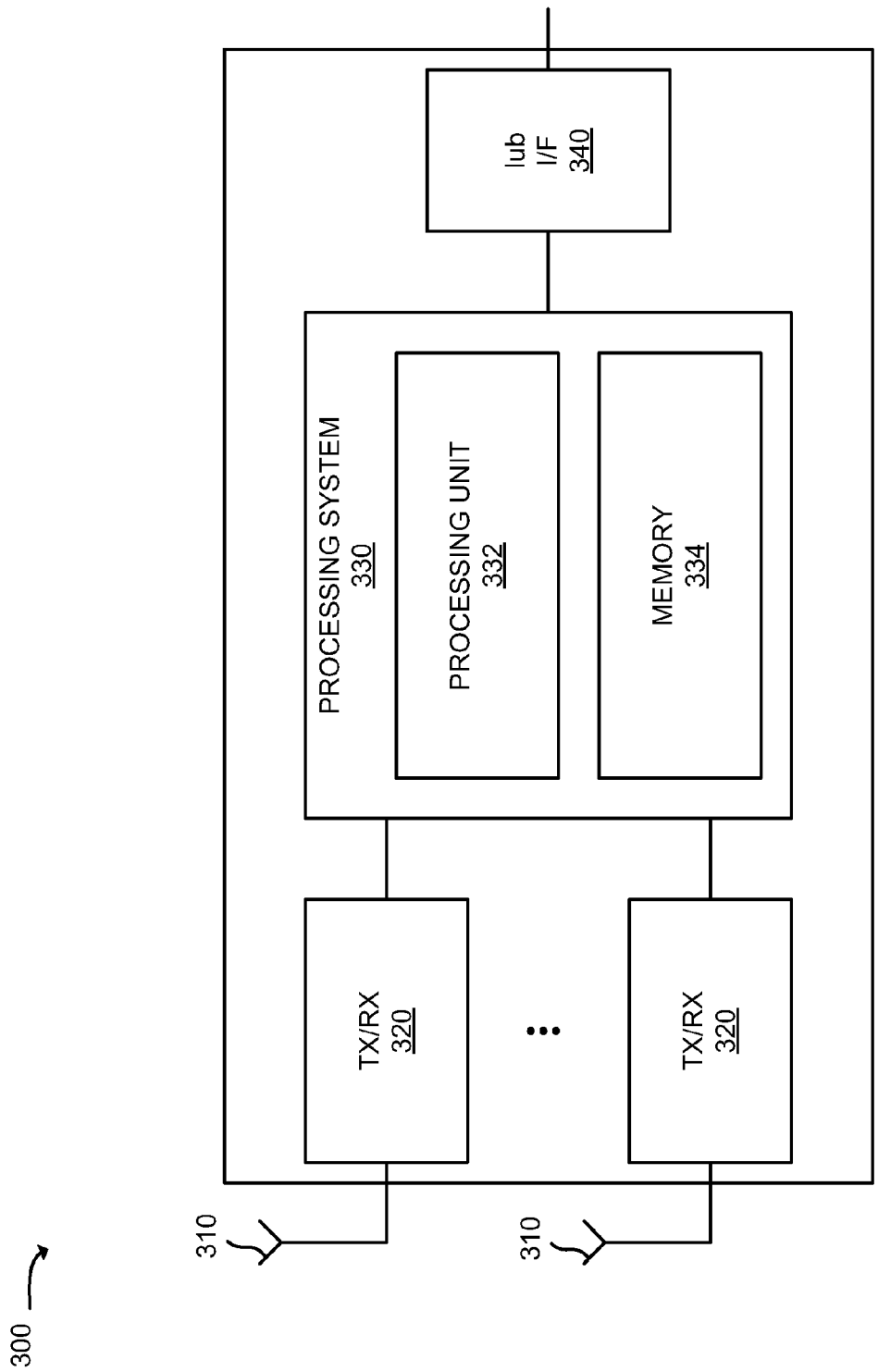
FIG. 3 is a diagram of example components of a base station of FIG. 1.

FIG. 3 is a diagram of example components of device 300 that may correspond to base station 120. Alternatively, or additionally, base station 120 may include one or more devices 300 and/or one or more components of device 300.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

As shown in FIG. 3, device 300 may include antennas 310, transceivers (TX/RX) 320, a processing system 330, and an Iub interface (I/F) 340. Antennas 310 may include one or more directional and/or omni-directional antennas. Transceivers 320 may be associated with antennas 310 and may include transceiver circuitry for transmitting and/or receiving symbol sequences in a network, such as network 170, via antennas 310.

Processing system 330 may control the operation of device 300. Processing system 330 may also process information received via transceivers 320 and Iub interface 340. Processing system 330 may further measure quality and strength of a connection, may determine a frame error rate (FER), and may transmit this information to network 170. As illustrated, processing system 330 may include a processing unit 332 and a memory 334.

Processing unit 332 may include one or more processors, microprocessors, application specific integrated circuits (ASICs), field programmable gate arrays (FPGAs), or the like. Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a random access memory (RAM), a read-only memory (ROM), and/or another type of memory to store data and instructions that may be used by processing unit 332.

Iub interface 340 may include one or more line cards that allow device 300 to transmit data to and receive data from another device, such as a radio network controller.

As described herein, device 300 may perform certain operations in response to processing unit 332 executing software instructions contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

Figure 4:
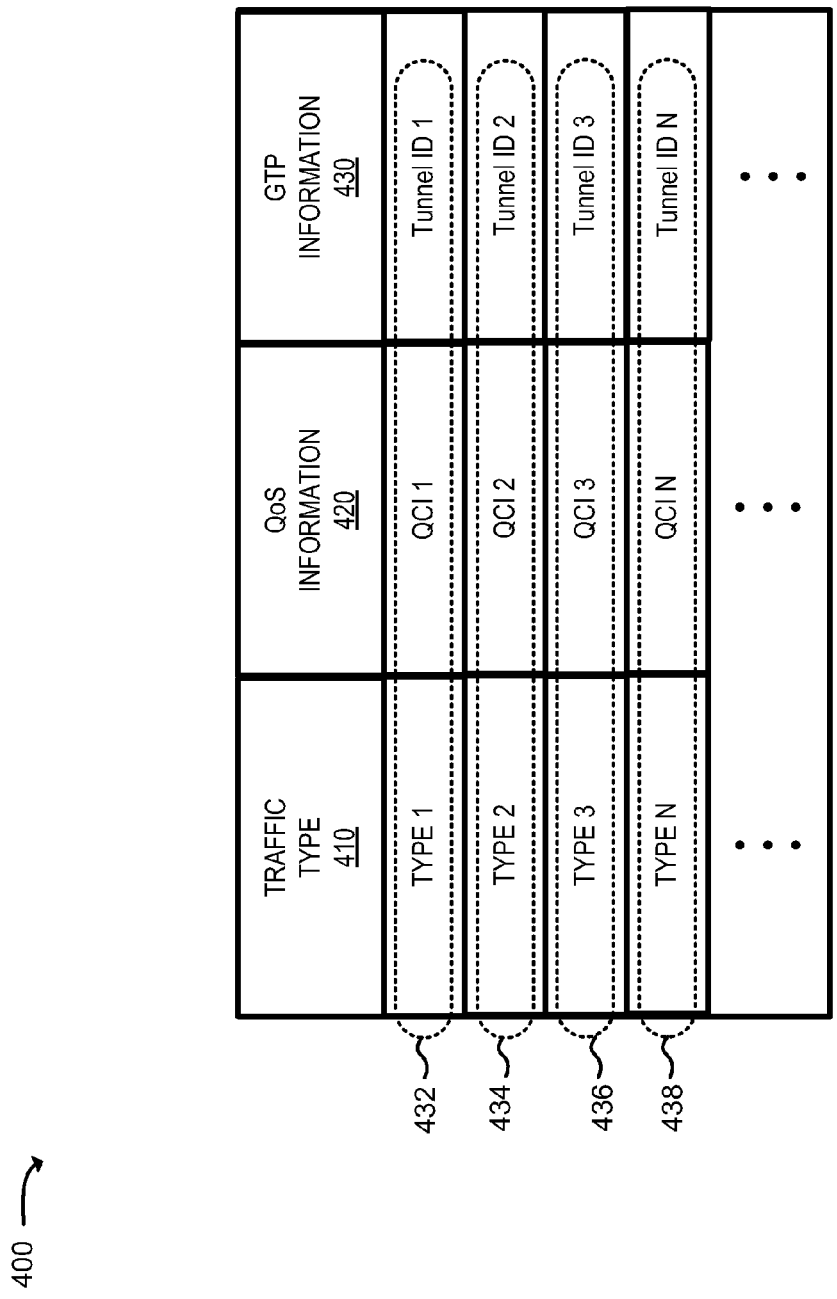
FIG. 4 is a diagram of an example data structure that stores information used to create packets that are transmitted to a user device.

FIG. 4 is a diagram of an example data structure 400 that stores information used to create packets that are transmitted to user device 110. In one example implementation, base station 120 may store data structure 400. Alternatively, or additionally, data structure 400 may be stored in a memory, associated with another device or a group of devices, separate from or in combination with the memory associated with base station 120.

Data structure 400 may include a collection of fields, such as a traffic type field 410, a quality of service (QoS) information field 420, and a general packet radio service (GPRS) tunneling protocol-user (GTP-U) information field 430. Although FIG. 4 shows example fields 410-430, in other implementations, data structure 400 may include fewer fields, different fields, additional fields, and/or differently arranged fields than depicted in FIG. 4. Additionally, or alternatively, one or more fields of data structure 400 may include information described as being included in one or more other fields of data structure 400.

Traffic type field 410 may store information that corresponds to a particular type of traffic. The particular type of traffic may include, for example, an audio stream, a video stream, statistics associated with a live video stream, Internet traffic, etc.

QoS information field 420 may store a particular QoS classification identifier (QCI) value (e.g., 1, 2, 3, etc.) that corresponds to a particular type of traffic identified in traffic type field 410. Each QCI value may correspond to a respective forwarding priority, data rate, bandwidth, probability of packet loss, etc. Network devices, such as base station 120, SGW 140, and/or PGW 150, may process and/or transmit traffic based on a QCI value.

GTP-U information field 430 may store a particular tunnel identifier (ID) that corresponds to a particular type of traffic identified in traffic type field 410. Each particular tunnel identifier may correspond to a particular tunnel between, for example, base station 120 and PGW 150. PGW 150 may transmit packets to user device 110 via the particular tunnel.

In one example, base station 120 may store a QCI value (e.g., QCI 1) and a tunnel ID (e.g., Tunnel ID 1) that corresponds to a type of traffic (e.g., TYPE 1) (e.g., as shown by ellipse 432). Alternatively, or additionally, base station 120 may store another QCI value (e.g., QCI 2) and another tunnel ID (e.g., Tunnel ID 2) that corresponds to another type of traffic (e.g., TYPE 2) (e.g., as shown by ellipse 434). Base station 120 may further store other QCI values (e.g., QCI 3, . . . , QCI N, where N≥1) and other tunnel IDs (e.g., Tunnel ID 3, . . . , Tunnel ID N) (e.g., as shown by ellipses 436 and 438) that correspond to other types of traffic (e.g., TYPE 3, . . . , TYPE N).

Figure 5:
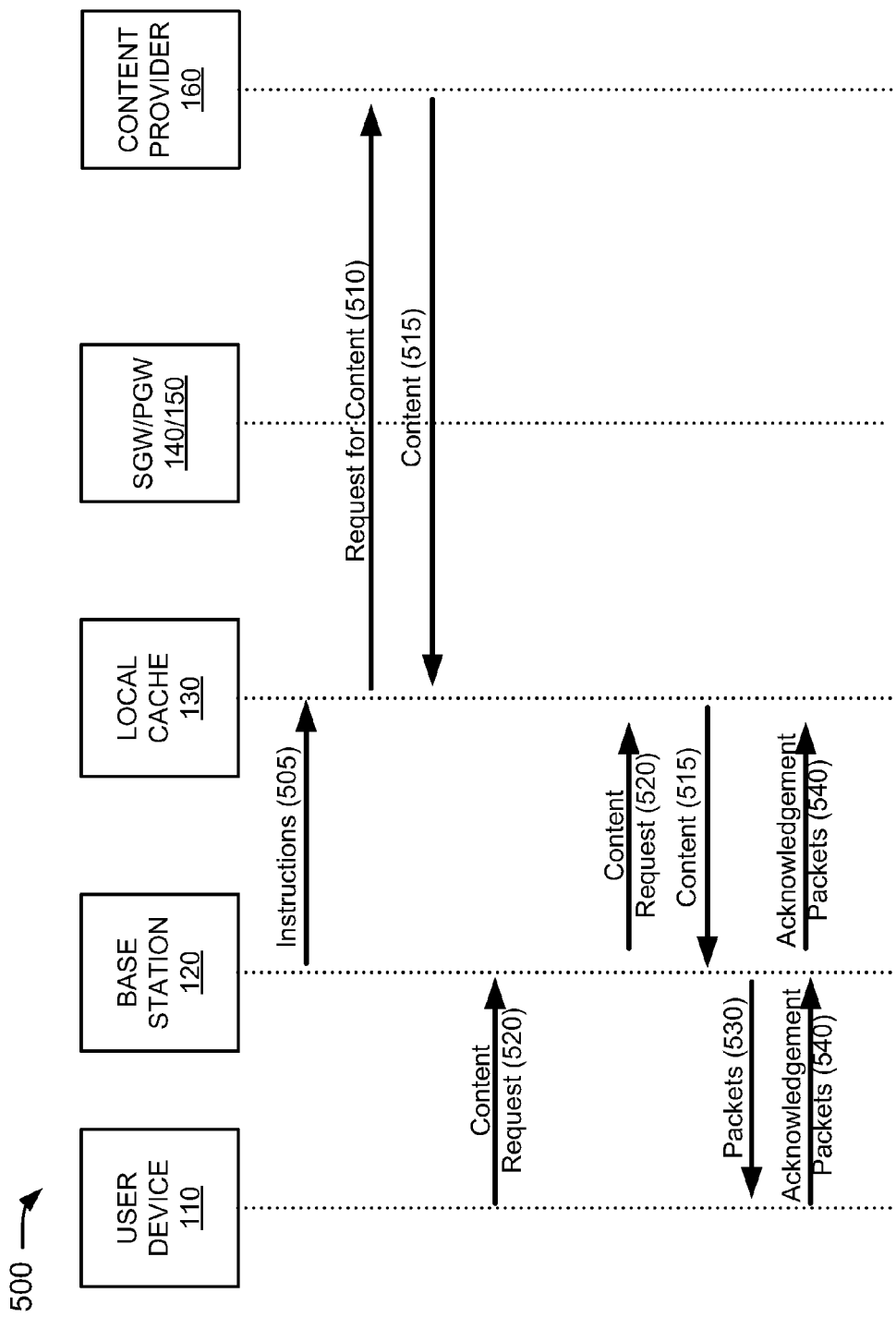
FIG. 5 is a flow diagram of example operations capable of being performed by an example portion of the environment in FIG. 1.

FIG. 5 is a flow diagram of example operations capable of being performed by an example portion 500 of environment 100. As shown in FIG. 5, portion 500 may include user device 110, local cache 130, SGW 140, PGW 150, and content provider 160. User device 110, local cache 130, SGW 140, PGW 150, and content provider 160 may include the features described above in connection with, for example, one or more of FIGS. 1-4.

As further shown in FIG. 5, when base station 120 determines that content 515 is frequently requested by user devices 110 associated with base station 120, as described further below with reference to FIG. 6, base station 120 may transmit instructions 505 to local cache 130. Local cache 130 may receive instructions 505. In one example implementation, instructions 505 may instruct local cache 130 to retrieve content 515 from content provider 160. Based on instructions 505, local cache 130 may transmit a request 510 for content 515 to content provider 160 via SGW 140, PGW 150, and network 170 (not shown in FIG. 5). Content provider 160 may receive request 510, and may transmit content 515, via SGW 140, PGW 150, and network 170, to local cache 130 in response to request 510. In another example implementation, base station 120 may transmit instructions 505 to local cache 130 with content 515. Instructions 505 may instruction local cache 130 to store content 515 received from base station 120.

Local cache 130 may store content 515 based on instructions 505. Base station 120 may store a list of identifiers associated with content that is stored by local cache 130. After transmitting instructions 505 to local cache 130, base station may add an identifier (e.g., a Uniform Resource Locator (URL)) associated with content 515 to the list of identifiers.

At a later time, a user of user device 110 may prompt user device 110 to transmit a content request 520, for content 515, to base station 120. In one example, content request 520 may be Hypertext Transfer Protocol (HTTP) GET request. In one example implementation, content request 520 may include the identifier associated with content 515. Base station 120 may determine whether the identifier, included in content request 520, is included in the list of identifiers stored by base station 120. If base station 120 determines that the identifier is included in the list of identifiers, base station 120 may forward content request 520 to local cache 130. In another example implementation, base station 120 may determine whether the content, included in content request 520, matches content associated with an identifier included in the list of identifiers stored by base station 120. If base station 120 determines that the content matches content associated with an identifier included in the list of identifiers, base station 120 may incorporate the identifier into content request 520, and may forward content request 520 to local cache 130.

Local cache 130 may receive content request 520 from base station 120. Local cache 130 may further retrieve content 515 based on content request 520 (e.g., based on the identifier in content request 520), and may transmit content 515 to base station 120.

Base station 120 may create packets 530 based on content 515, and may transmit packets 530 to user device 110. Packets 530 may include IP packets, and may have the same type of format as packets that are transmitted by PGW 150 to user device 110 for content 515. User device 110 may receive packets 530, and may transmit acknowledgement packets 540, in response to packets 530, to base station 120. Base station 120 may receive acknowledgement packets 540, and may forward acknowledgement packets 540 to local cache 130. Acknowledgement packets 540 may indicate that user device 110 received packets 530 associated with content 515. Local cache 130 may store and/or discard acknowledgement packets 540.

Figure 6:
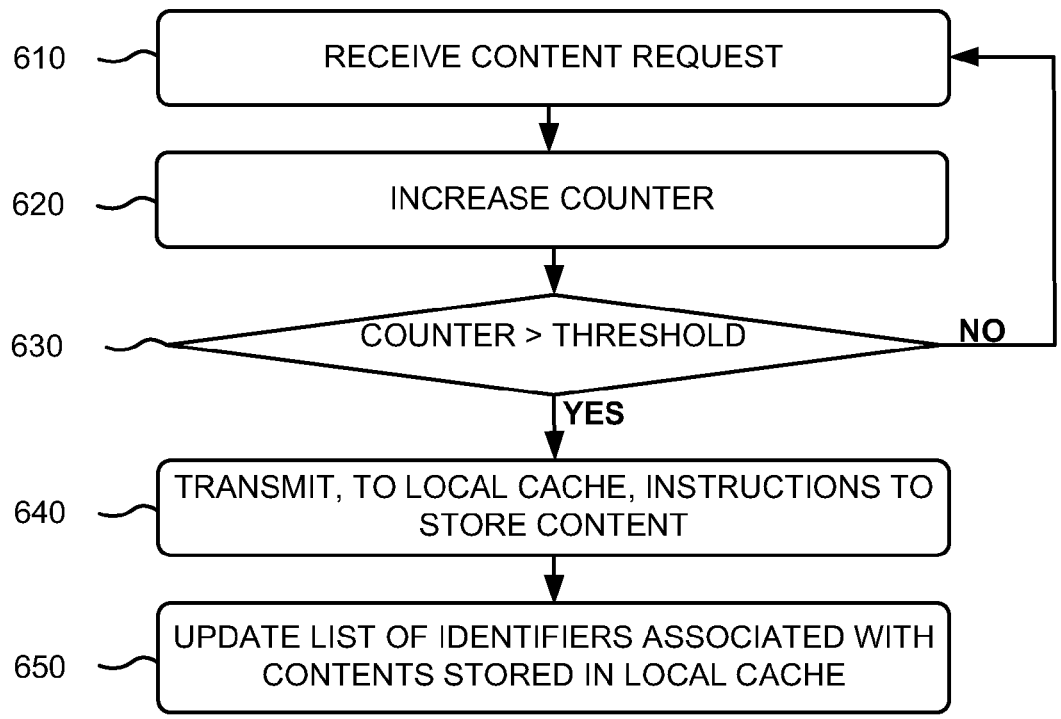
FIG. 6 is a flow chart of an example process for instructing a local cache to store content and creating a list of identifiers associated with content stored by the local cache.

FIG. 6 is a flow chart of an example process 600 for instructing local cache 130 to store content and creating a list of identifiers associated with content stored by local cache 130. In one implementation, process 600 may be performed by base station 120. Alternatively, or additionally, some or all of process 600 may be performed by another device or group of devices, including or excluding base station 120. For example, SGW 140 may perform process 600.

As shown in FIG. 6, process 600 may include receiving a content request (block 610), increasing a counter (block 620), and determining whether the counter is greater than a threshold (block 630). For example, base station 120 may receive content request 520, for content 515, from user device 110. Base station 120 may increase a value of a counter associated with content 515 by a number (e.g., one, two, etc.), and may determine whether the value of the counter is greater than a threshold (e.g., three, four, five, etc.).

If the counter is greater than the threshold (block 630—YES), process 600 may include transmitting, to a local cache, instructions to store the content (block 640) and updating a list of identifiers associated with content stored in the local cache (block 650). For example, when base station 120 determines that the value of the counter is greater than the threshold, base station 120 may transmit instructions 505 to local cache 130. Local cache 130 may retrieve and/or store content 515 based on instructions 505. Furthermore, when base station 120 transmits instructions 505 to local cache 130, base station 120 may create or determine an identifier associated with content 515. Base station 120 may update a list of identifiers, associated with content stored in local cache 130, by adding the identifier to the list of identifiers.

If the counter is less than the threshold (block 630—NO), process 600 may include receiving another content request (block 610). For example, when base station 120 determines that the counter is less than or equal to the threshold, base station 120 may continue to receive content request(s) and may increase the counter.

Figure 7:
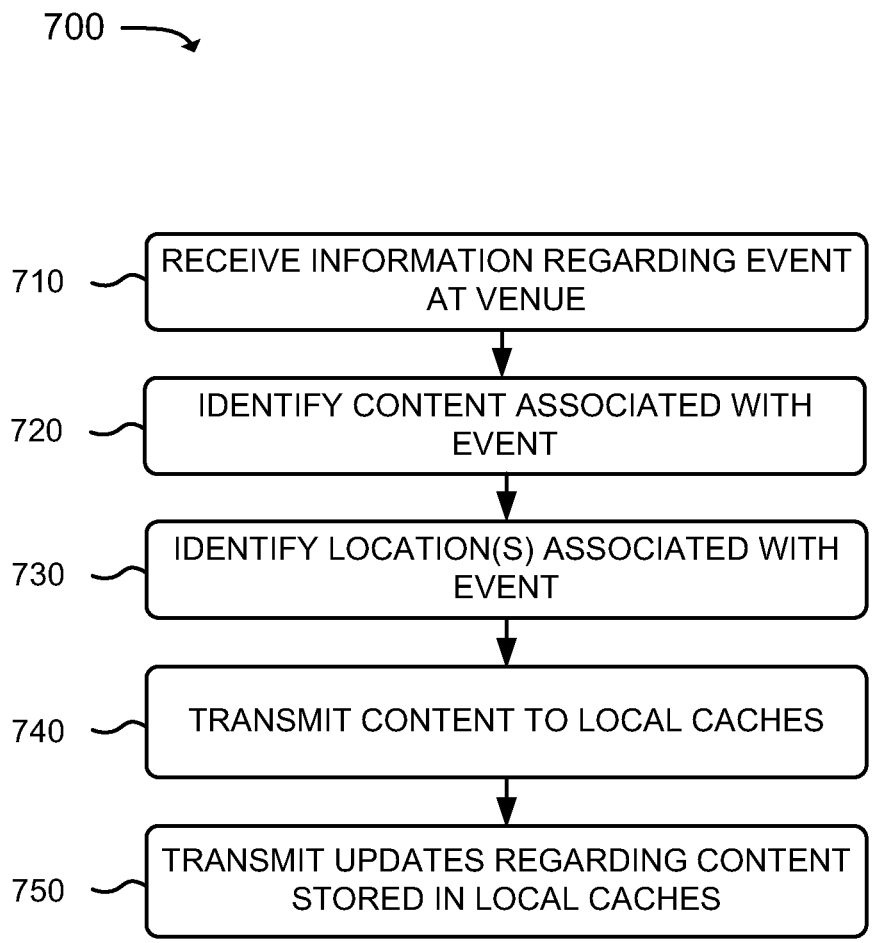
FIG. 7 is a flow chart of another example process for providing content to local caches.

FIG. 7 is a flow chart of another example process for providing content to local caches 130. In one implementation, process 700 may be performed by content provider 160. Alternatively, or additionally, some or all of process 700 may be performed by another device or group of devices, including or excluding content provider 160.

As shown in FIG. 7, process 700 may include receiving information regarding an event at a venue (block 710), identifying content associated with the event (block 720), and identifying one or more locations associated with the event (block 730). In one example implementation, content provider 160 may receive information regarding an upcoming event at a venue. Content provider 160 may identify, based on the information, content 515 that is associated with the upcoming event and one or more locations that are associated with the upcoming event.

In one example, the upcoming event may include a regular season football game between a team from New York City and a team from New England. Content 515 may include statistics, information about players, video clips of previous games, and/or other information that users, who are watching the game, are likely to request during the game. The one or more locations may include geographic areas where the users are most likely to be located, such as in the New York City area and in New England.

Process 700 may also include transmitting the content to local caches (block 740) and transmitting updates regarding the content that is stored in the local caches (block 750). In one example implementation, content provider 160 may retrieve content 515. Content provider 160 may identify local caches 130 that provide content to base stations 120 associated with the identified locations. Content provider 160 may transmit content 515 to the identified local caches 130, and may transmit updates, regarding the content that is stored in the identified local caches 130, to base stations 120 associated with the identified locations. Each update may include one or more identifiers associated with content 515. Each base station 120 may update, based on the one or more identifiers, a list of identifiers associated with content that is stored by a corresponding local cache 130.

Figure 8:
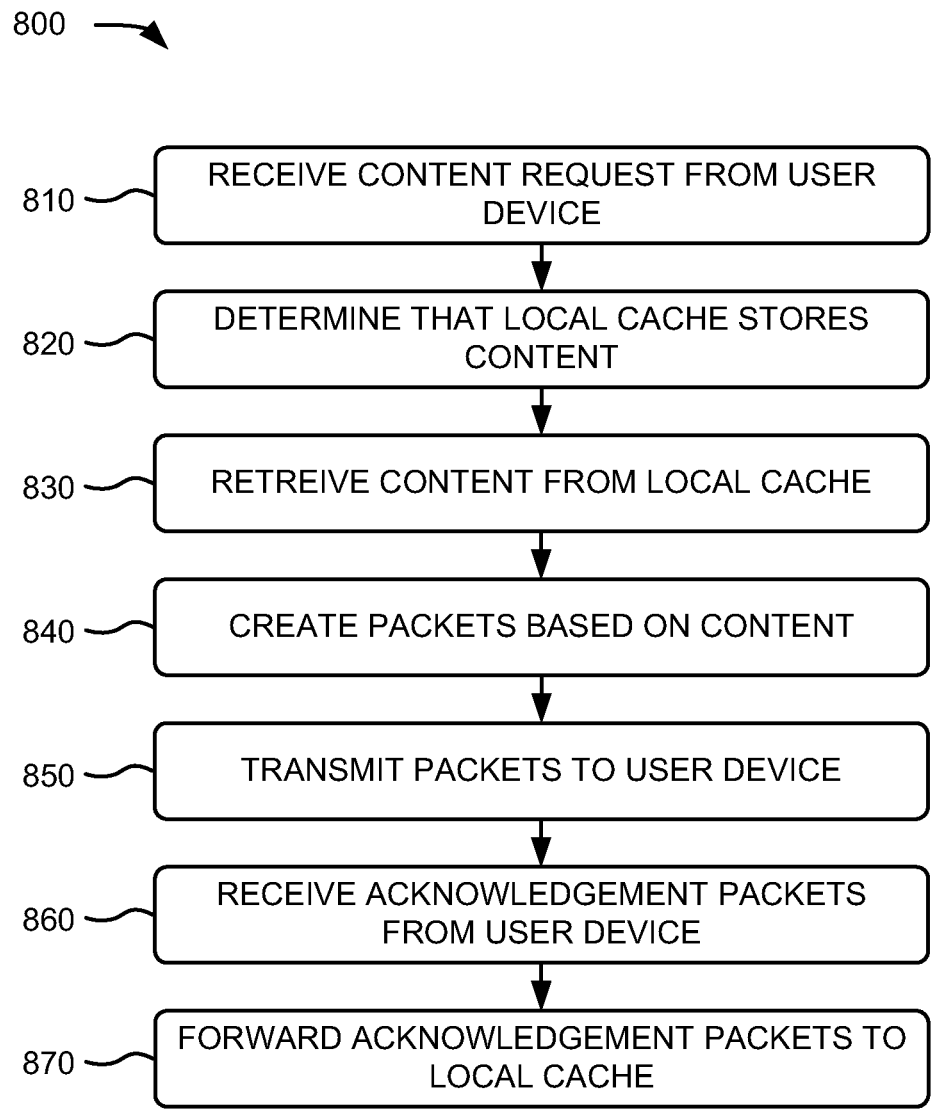
FIG. 8 is a flow chart of an example process for retrieving content from a local cache.

FIG. 8 is a flow chart of an example process 800 for retrieving content from local cache 130. In one example implementation, process 800 may be performed by base station 120. Alternatively, or additionally, some or all of process 800 may be performed by another device or group of devices, including or excluding base station 120. For example, SGW 140 may perform process 800.

Process 800 may include receiving a content request from a user device (block 810). In one example implementation, a user may prompt user device 110 to retrieve content 515. In response, user device 110 may generate content request 520, and may transmit content request 520 to base station 120. Base station 120 may receive content request 520 from user device 110. Additionally, base station 120 may determine a particular QCI value associated with content request 520, and may store the particular QCI value.

Process 800 may further include determining that a local cache stores the content (block 820). In one example implementation, base station 120 may store a list of identifiers associated with content that is stored by local cache 130. Content request 520 may include an identifier associated with content 515. Base station 120 may determine whether the identifier is included in the list of identifiers. When base station 120 determines that the identifier is included in the list of identifiers, base station 120 may determine that local cache 130 stores content 515.

Alternatively, when base station 120 determines that the identifier is not included in the list of identifiers, base station 120 may determine that local cache 130 does not store content 515. When base station 120 determines that local cache 130 does not store content 515, base station 120 may proceed with retrieving content 515 from content provider 160 via SGW 140, PGW 150, and network 170.

Returning to FIG. 8, process 800 may include retrieving the content from the local cache (block 830). In one example implementation, when base station 120 determines that local cache 130 stores content 515, base station 120 may retrieve content 515 from local cache 130. For example, base station 120 may forward content request 520 to local cache 130. In response to content request 520, local cache 130 may retrieve content 515, and may transmit content 515 to base station 120.

Process 800 may include creating packets based on the content (block 840) and transmitting the packets to the user device (block 850). In one example implementation, base station 120 may determine a type of traffic associated with content 515. Base station 120 may further determine QoS information and GTP information associated with the type of traffic. Base station 120 may create packets 530 based on content 515. Each packet, of packets 530, may include a portion of content 515, the QoS information, and the GTP information. Base station 120 may transmit packets 530 to user device 110 based on the particular QCI value associated with content request 520.

Alternatively, or additionally, content 515 may already be in the form of packets 530. Base station 120 may receive packets 530 via an S1-U interface from local cache 130, and may forward packets 530 to user device 110 based on the particular QCI value associated with the receipt of content request 520.

Process 800 may include receiving acknowledgement packets from the user device (block 860) and forwarding the acknowledgement packets to the local cache (block 870). In one implementation, user device 110 may receive packets 530 from base station 120, and may transmit acknowledgement packets 540, in response to packets 530, to base station 120. Base station 120 may receive acknowledgement packets 540 from user device 110, and may forward acknowledgement packets 540 to local cache 130.

Systems and/or methods described herein may allow a base station or a SGW to retrieve content from a local cache. When the local cache stores content requested by a user device, each time the user device transmits a content request to the base station, the base station does not have to retrieve requested content from a content provider via a SGW, a PGW, and/or a network.

The foregoing description of implementations provides illustration and description, but is not intended to be exhaustive or to limit the implementations to the precise form disclosed. Modifications and variations are possible in light of the above disclosure or may be acquired from practice of the implementations.

Furthermore, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device and from a mobile device, a request for content;
   determining, by the network device, whether the content is stored in a cache located proximate to the network device;
   retrieving, by the network device, the content from the cache when the content is stored in the cache;
   determining, by the network device, a type of traffic associated with the content;
   determining, by the network device, a general packet radio service (GPRS) tunneling protocol-user (GTP-U) tunnel identifier associated with the type of traffic;
   creating, by the network device, packets based on the content and the GTP-U tunnel identifier, wherein each packet of the packets includes the GTP-U tunnel identifier;
   transmitting, by the network device, the packets to the mobile device;
   receiving, by the network device and from the mobile device, acknowledgement packets in response to the packets; and
   forwarding, by the network device, the acknowledgement packets to the cache for storage at the cache.

2. The method of claim 1, where the network device includes a base station or a serving gateway.

3. The method of claim 1, where determining whether the content is stored in the cache comprises:
   determining, based on the request, an identifier associated with the content,
   determining whether the identifier is included in a list of identifiers, and
   determining that the content is stored in the cache when the identifier is included in the list of identifiers.

4. The method of claim 1, further comprising:
   determining a quality of service (QoS) classification identifier (QCI) value associated with the request,
   where transmitting the packets comprises:
      transmitting the packets to the mobile device based on the QCI value.

5. The method of claim 1, where creating the packets comprises:
   determining a quality of service (QoS) classification identifier (QCI) value associated with the type of traffic, and
   creating the packets based on the QCI value, wherein each one of the packets includes the QCI value.

6. The method of claim 1, further comprising:
   receiving, before receiving the request, a previous request for the content,
   increasing a counter associated with the content based on receipt of the request,
   determining whether the counter is greater than a threshold, and
   transmitting, to the cache, instructions to store the content when the counter is greater than the threshold.

7. The method of claim 6, where the instructions to store the content comprise instructions to retrieve the content from a content provider associated with the content.

8. The method of claim 6, further comprising:
   identifying, after transmitting the instructions, an identifier associated with the content, and
   adding the identifier to a list of identifiers associated with content stored by the cache.

9. A network device comprising:
   a processor to:
      transmit, to a cache located proximate to the network device, instructions to store content in the cache, the cache storing the content based on the instructions,
      receive a request for the content from a mobile communication device,
      determine, based on the request, that the content is stored in the cache,
      retrieve the content from the cache,
      determine a type of traffic associated with the content,
      determine a general packet radio service (GPRS) tunneling protocol-user (GTP-U) tunnel identifier associated with the type of traffic,
      create one or more packets based on the retrieved content and the GTP-U tunnel identifier, wherein each packet of the one or more packets includes the GTP-U tunnel identifier,
      transmit the one or more packets to the mobile communication device,
      receive, from the mobile communication device, acknowledgement packets in response to transmitting the one or more packets; and
      forward the acknowledgement packets to the cache for storage at the cache.

10. The network device of claim 9, where the instructions to store the content comprise instructions to retrieve the content from a content provider associated with the content.

11. The network device of claim 9, where, when transmitting the instructions, the processor is to:
    receive a previous request for the content,
    increase, based on the request, a counter associated with the content,
    determine whether the counter is greater than a threshold, and
    transmit the instructions to store the content when the counter is greater than the threshold.

12. The network device of claim 9, where the processor is further configured to:
    identify an identifier associated with the content, and
    add the identifier to a list of identifiers associated with content stored by the cache.

13. The network device of claim 12, where, when determining that the content is stored in the cache, the processor is to:
    determine whether the identifier is included in the list of identifiers, and
    determine that the content is stored in the cache when the identifier is included in the list of identifiers.

14. The network device of claim 9, where, when creating the one or more packets, the processor is to:
    determine a quality of service (QoS) classification identifier (QCI) value associated with the type of traffic, and
    create the one or more packets based on the QCI value, wherein each packet of the one or more packets includes the QCI value.

15. A non-transitory computer-readable medium, comprising:
    one or more instructions that, when executed by one or more processors of a device, cause the one or more processors to:
       receive a request for content from a mobile device,
       determine an identifier associated with the content,
       determine whether the identifier is included in a list of identifiers associated with content stored by a cache located proximate to or within the device, retrieve the content from the cache when the identifier is included in the list of identifiers, retrieve the content from a content provider device when the identifier is not included in the list of identifiers, determine a type of traffic associated with the content, determine a general packet radio service (GPRS) tunneling protocol-user (GTP-U) tunnel identifier associated with the type of traffic, create one or more packets based on the content and the GTP-U tunnel identifier, wherein each packet of the one or more packets includes the GTP-U tunnel identifier, transmit the one or more packets to the mobile device, receive, from the mobile device, acknowledgement packets in response to transmitting the one or more packets, and forward the acknowledgement packets to the cache for storage at the cache.

16. The computer-readable medium of claim 15, further comprising:

one or more instructions that, when executed by the one or more processors of the device, cause the one or more processors to:

determine a quality of service (QoS) classification identifier (QCI) value associated with the type of traffic, wherein each one of the one or more packets includes the QCI value.

17. The computer-readable medium of claim 15, further comprising:

one or more instructions that, when executed by the one or more processors of the device, cause the one or more processors to:

increase, based on the request, a counter associated with the content, determine whether the counter is greater than a threshold, and transmit, to the cache, information instructing the cache to retrieve and store the content when the counter is greater than the threshold.

18. The computer-readable medium of claim 17, further comprising:

one or more instructions that, when executed by the one or more processors of the device, cause the one or more processors to:

add, after transmitting the information, the identifier to the list of identifiers.

19. The computer-readable medium of claim 17, where the information includes instructions to retrieve the content from the content provider device.

20. The computer-readable medium of claim 15, where the device includes a base station or a serving gateway.

* * * * *